United States Patent

Hung

[11] Patent Number: 5,404,181
[45] Date of Patent: Apr. 4, 1995

[54] MONITOR FILTER

[76] Inventor: Chin-Lung Hung, P.O. Box 82-144, Taipei, Taiwan, Prov. of China

[21] Appl. No.: 111,484

[22] Filed: Aug. 25, 1993

[51] Int. Cl.[6] .................................................. H04N 5/72
[52] U.S. Cl. .................................... 348/786; 348/823; 348/835; 348/818; 359/601
[58] Field of Search ............... 348/786, 823, 834, 835, 348/824; 359/601, 609, 614; H04N 5/72; 160/380; 362/293, 455; 313/474

[56] References Cited

U.S. PATENT DOCUMENTS

| 923,626 | 4/1863 | Rinaldi et al. | 359/601 |
| 4,504,867 | 3/1985 | Keller | 348/834 |
| 4,633,322 | 12/1986 | Fourny | 348/834 |
| 4,745,518 | 5/1988 | Fang | 348/834 |
| 4,788,597 | 11/1988 | Gart et al. | 348/834 |
| 4,880,300 | 11/1989 | Payner et al. | 359/601 |

FOREIGN PATENT DOCUMENTS 2670981  6/1992  France ..................... H04N 5/72
2680760  9/1993  France ..................... H04N 5/72

Primary Examiner—Edward L. Coles, Sr.
Assistant Examiner—Fan Lee
Attorney, Agent, or Firm—Alfred Lei

[57] ABSTRACT

A monitor filter includes a body having a front cover formed on an upper edge with a recess having a semi-tubular portion at both ends, a rear cover formed on an upper edge with a recess having a semi-tubular portion at both ends, the semi-tubular portion of the rear cover being adapted to the semi-tubular portion of the front cover to form a tubular portion, a spring fitted in the tubular portion, a screen disposed between the front cover and the rear cover; and a fixing frame having two toothed ends each having a protuberance engaged with the spring, the fixing frame being formed with a groove on a top for receiving the body; whereby the monitor filter can be easily assembled and can be turned over through an angle of 210 degrees thereby making it easier to be cleaned.

1 Claim, 4 Drawing Sheets

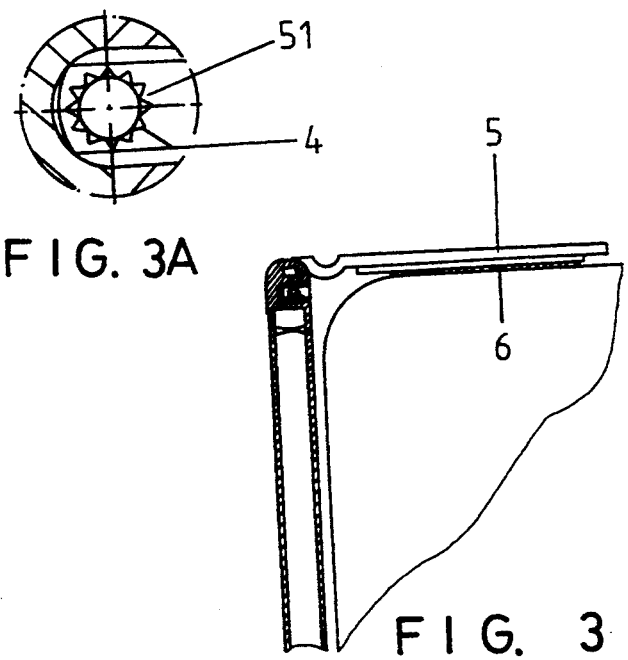
FIG. 3A
FIG. 3
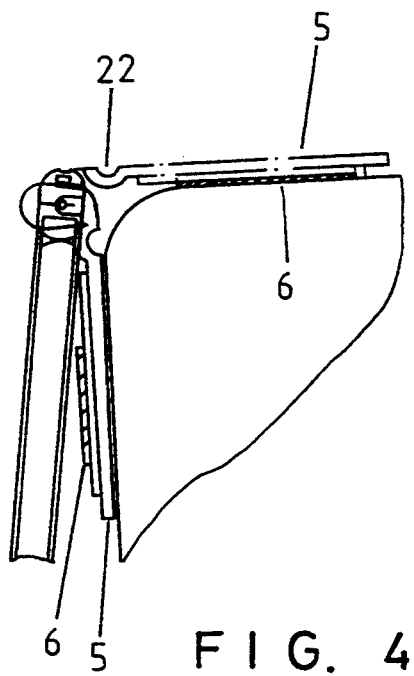
FIG. 4

MONITOR FILTER

BACKGROUND OF THE INVENTION

It has been found that glare, reflection and static induction will be produced when a monitor is in use. Hence, the glare and the reflection will damage the eyesight while the static induction will hurt both the eyesight and the face skin of the operation. Hence, a number of monitor filters have been developed to reduce glare, reflection and static induction. However, all of them are inconvenient in operation thereby causing much trouble in use.

Therefore, it is an object of the present invention to provide an improved monitor filter which may obviate and mitigate the above-mentioned drawback.

SUMMARY OF THE INVENTION

This invention relates to an improved monitor filter.

It is the primary object of the present invention to provide a monitor filter which is easy to assemble.

It is another object of the present invention to provide a monitor filter which is convenient-to use.

It is still another object of the present invention to provide a monitor filter which is simple in construction.

It is still another object of the present invention to provide a monitor filter which is facile to be cleaned.

It is a further object of the present invention to provide a monitor filter which can be firmly mounted on a monitor.

Other objects and merits and a fuller understanding of the present invention will be obtained by those having ordinary skill in the art when the following detailed description of the preferred embodiment is read in conjunction with the accompanying drawings wherein like numerals refer to like or similar parts.

BRIEF DESCRIPTION OF THE DRAWINGS

FIG. 1A is an enlarged fragmentary view of the present invention; and

FIG. 3 is an enlarged fragmentary view of the present invention;

FIG. 3A shows the engagement between the body and the fixing frame;

FIG. 4 shows the way to mount the present invention on a monitor; and

DETAILED DESCRIPTION OF THE PREFERRED EMBODIMENT

Figure 1:
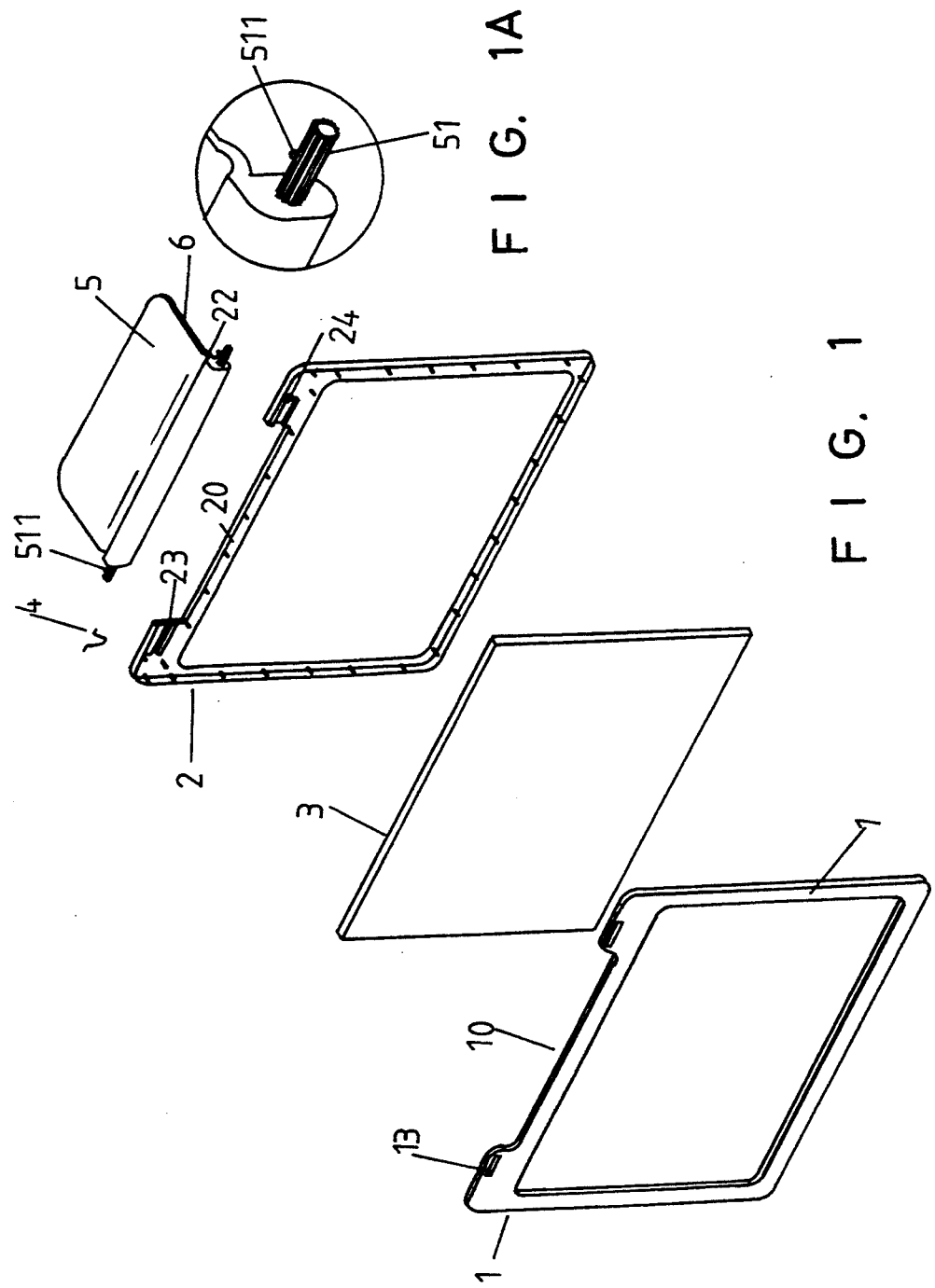
FIG. 1 is an exploded view of the present invention.
Figure 2:
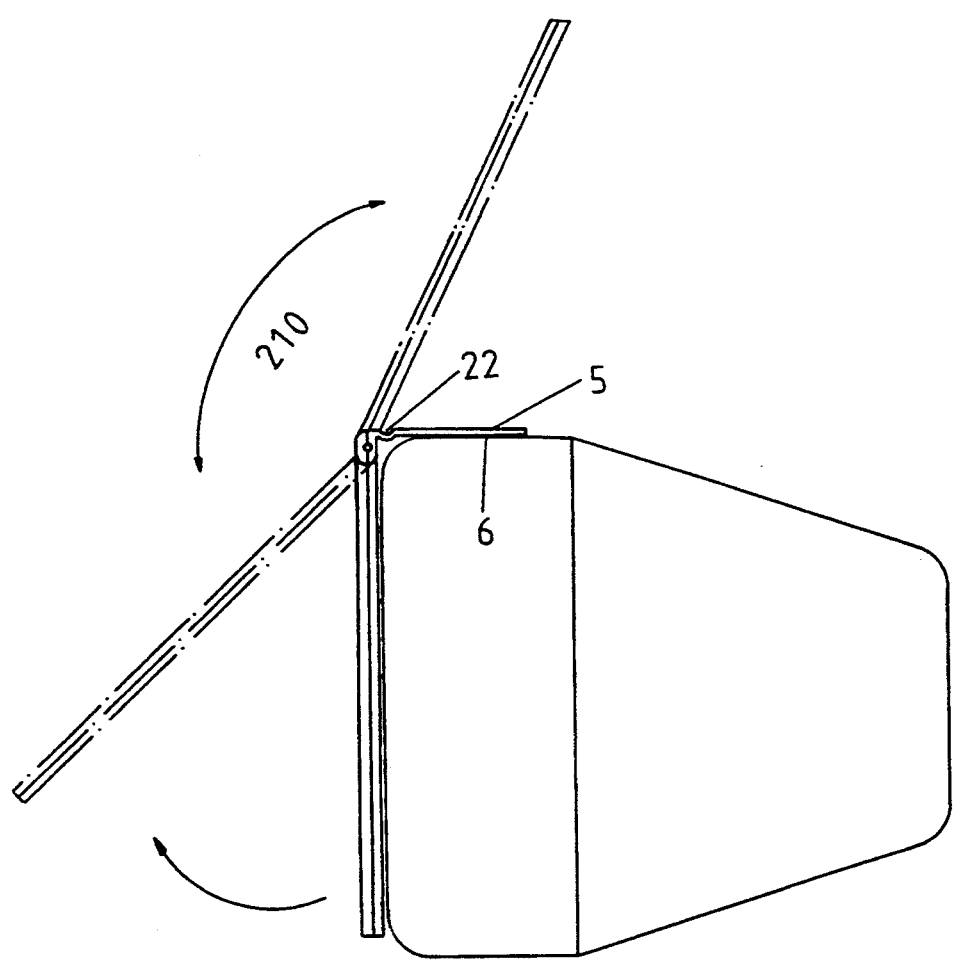
FIG. 2 shows the principle of the present invention.
Figure 5:
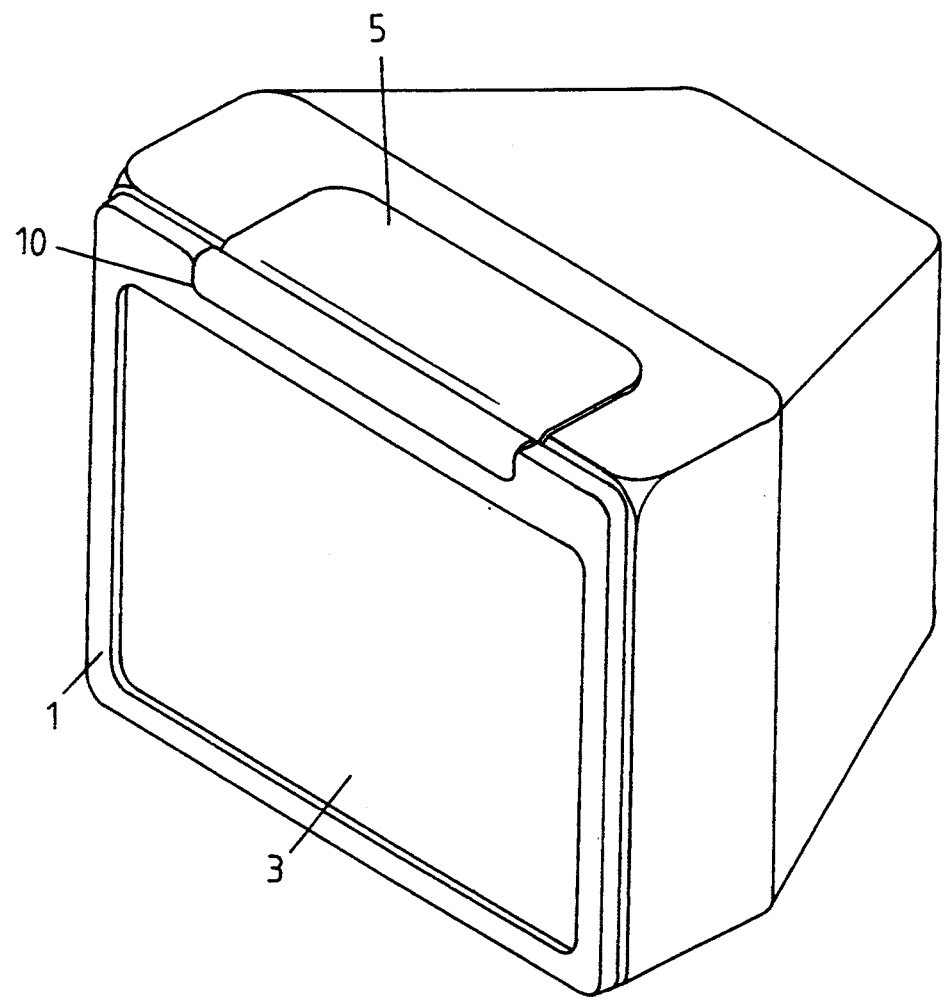
FIG. 5 is a working view of the present invention.

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIG. 1A thereof, the monitor filter according to the present invention comprises a body which is composed of a front cover 1, a rear cover 2, and an anti-radiation screen 3. The front cover 1 is formed with on the upper edge with a recess 10 on its an upper edge having a left semi-cylindrical portion 13 and a right semi-cylindrical portion 14. As the front cover 1, the rear cover 2 is formed with on the upper edge with a recess 20 on its upper edge having a left semi-cylindrical portion 23 and a right semi-cylindrical portion 24. Hence, when the front cover 1 is engaged with the rear cover 2, the left semi-cylindrical 13 and the right semi-cylindrical portion 14 of the front cover 1 will adapt to the left semi-cylindrical portion 23 and the right semi-cylindrical portion 24 of the rear cover 2 to form two tubular holes for receiving two toothed ends 51 of a fixing frame 5. The toothed ends 51 of the frame 5 is formed with a protuberance 511. A spring 4 is mounted in the tubular hole formed by the semi-cylindrical portion 13 of the front cover 1 and the semi-cylindrical portion 23 of the rear cover 2 and is engaged with the toothed end 51 of the fixing frame 5.

The screen 3 is disposed between the front cover 1 and the rear cover 2. A hook strap 6 is adhered at the bottom of the fixing frame 5 while a loop strap (not shown) is stuck on the top of a monitor.

Further, the fixing frame 5 is formed with a groove 22 (see FIGS. 2, 3, 3A, 4 and 5) on the top so that the monitor filter may be turned upwards and disposed in the groove 22.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A filter for a computer monitor comprising:
a body having a front cover formed on an edge with a recess having a first semi-cylindrical portion at both ends, a rear cover formed on an upper edge with a recess having a second semi-cylindrical portion at both ends, said first semi-cylindrical portion being adapted to said second semi-cylindrical portion to form a tubular portion, a spring fitted in said tubular portion, a screen disposed between said front cover and said rear cover; and
a fixing frame having two toothed ends each having a protuberance engaged with said spring, said fixing frame being formed with a groove on a top for receiving said body.

* * * * *